United States Patent [19]
Adewuyi et al.

[11] Patent Number: 5,997,728
[45] Date of Patent: Dec. 7, 1999

[54] CATALYST SYSTEM FOR MAXIMIZING LIGHT OLEFIN YIELDS IN FCC

[75] Inventors: Yusuf G. Adewuyi, Chadds Ford, Pa.; J. Scott Buchanan, Mercerville, N.J.

[73] Assignee: Mobil Oil Corporation, Fairfax, Va.

[21] Appl. No.: 08/048,964

[22] Filed: Apr. 16, 1993

Related U.S. Application Data

[63] Continuation of application No. 07/877,935, May 4, 1992, abandoned.

[51] Int. Cl.$^6$ .................................................. C10G 11/05
[52] U.S. Cl. ...................... 208/120.01; 208/113; 208/114; 208/118; 208/149
[58] Field of Search .................................... 208/113, 114, 208/118, 120, 149, 120.01

[56] References Cited

U.S. PATENT DOCUMENTS

| | | | |
|---|---|---|---|
| 3,758,403 | 9/1973 | Rosinski et al. | 208/120 |
| 3,847,793 | 11/1974 | Schwartz et al. | 208/70 |
| 3,886,060 | 5/1975 | Owen | 208/120 |
| 4,239,654 | 12/1980 | Gladrow et al. | 208/120 |
| 4,287,048 | 9/1981 | Gladrow et al. | 208/120 |
| 4,289,606 | 9/1981 | Gladrow et al. | 208/120 |
| 4,309,280 | 1/1982 | Rosinski et al. | 208/120 |
| 4,356,338 | 10/1982 | Young | 585/407 |
| 4,368,114 | 1/1983 | Chester et al. | 208/120 |
| 4,552,648 | 11/1985 | Rosinski et al. | 208/120 |

OTHER PUBLICATIONS

"Presulfiding, FCC Olefins Focus of Catalyst Sessions", Oil & Gas Journal, Mar. 16, 1992, pp. 37–38.

*Primary Examiner*—Walter D. Griffin
*Attorney, Agent, or Firm*—Robert B. Furr, Jr.; Malcolm D. Keen

[57] ABSTRACT

A process for catalytically cracking a heavy feed in an FCC unit, with large amounts of shape selective cracking additive is disclosed. The catalyst inventory preferably contains at least 10 wt % additive, of 12–40% ZSM-5 on an amorphous support, equivalent to more than 3.0 wt % ZSM-5 crystal circulating with equilibrium catalyst. Large yields of light olefins are produced, without excessive production of aromatics, or loss of gasoline yield. Operating with large amounts of additives allows yields of butadiene and/or methane to be suppressed, and production of a cracked gasoline fraction with an unusually low olefin content, and high ratio of cyclic unsaturates to normal unsaturates.

3 Claims, 1 Drawing Sheet

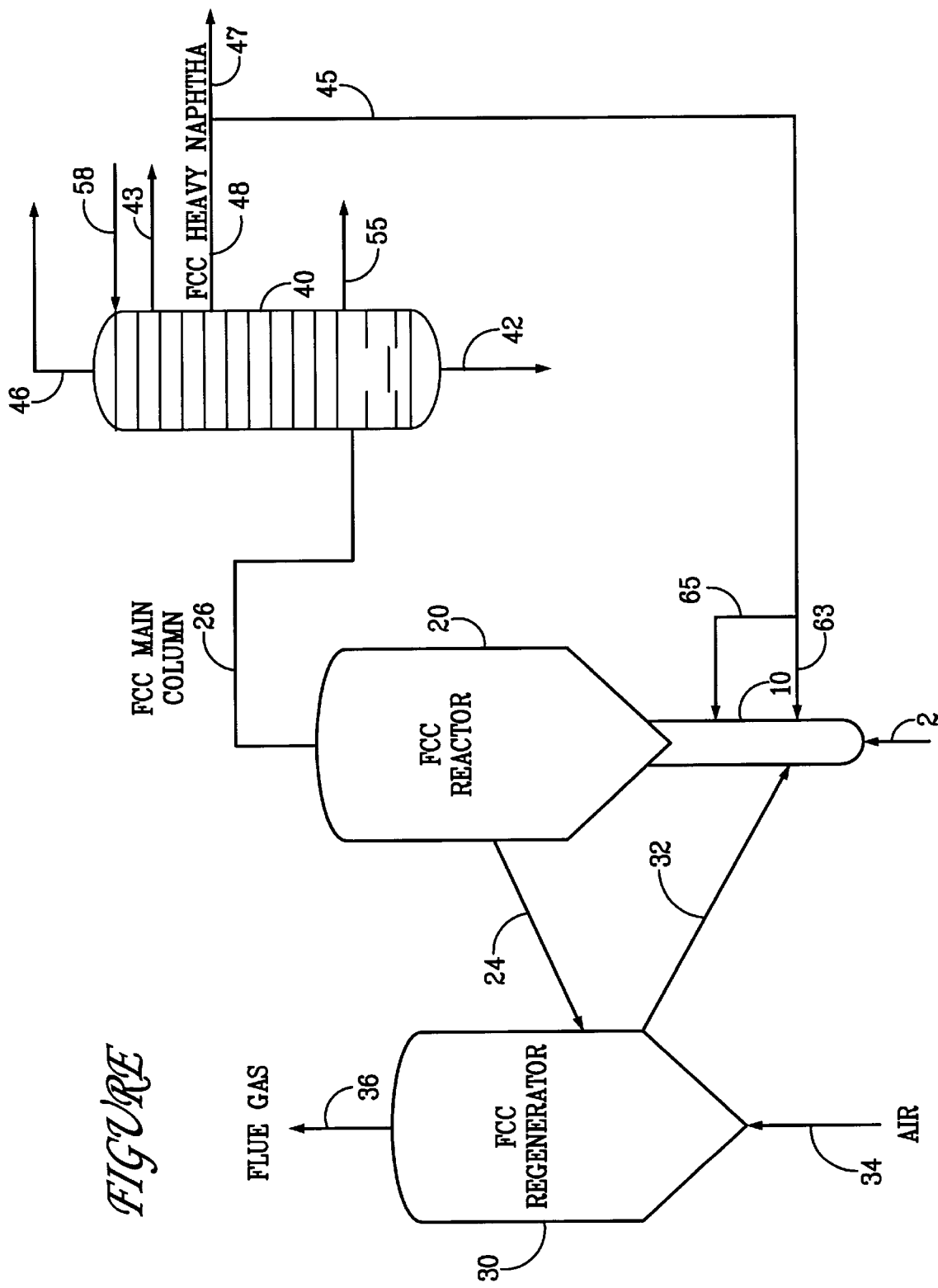

CATALYST SYSTEM FOR MAXIMIZING LIGHT OLEFIN YIELDS IN FCC

This is a continuation of application Ser. No. 07/877,935, filed on May 4, 1992, now abandoned.

BACKGROUND OF THE INVENTION

1. Field of the Invention

The invention relates to fluidized catalytic cracking.

2. Description of Related Art

In the fluidized catalytic cracking (FCC) process, catalyst, having a particle size and color resembling table salt and pepper, circulates between a cracking reactor and a catalyst regenerator. In the reactor, hydrocarbon feed contacts hot, regenerated catalyst which vaporizes and cracks the feed at 425° C.–600° C., usually 460° C.–560° C. The cracking reaction deposits carbonaceous hydrocarbons or coke on the catalyst, thereby deactivating it. The cracked products are separated from the coked catalyst. The coked catalyst is stripped of volatiles, usually with steam, in a catalyst stripper and then regenerated. The catalyst regenerator burns coke from the catalyst with oxygen containing gas, usually air, to restore catalyst activity and heat catalyst to, e.g., 500° C.–900° C., usually 600° C.–750° C. This heated catalyst recycles to the cracking reactor to crack more fresh feed. Flue gas from the regenerator may be treated to remove particulates or convert CO, and then discharged into the atmosphere.

Catalytic cracking has undergone progressive development since the 40s. The trend of development of the (FCC) process has been to all riser cracking and zeolite catalysts. A good overview of the importance of the FCC process, and its continuous advancement, is the Fluid Catalytic Cracking Report, Amos A. Avidan, Michael Edwards and Hartley Owen, in the Jan. 8, 1990 edition of the Oil & Gas Journal.

The product distribution from modern FCC units is good. The volume and octane number of the gasoline is satisfactory, and the light olefins produced are upgraded via sulfuric or HF alkylation to high quality alkylate.

Unfortunately, refiners are finding it more difficult to make gasoline of sufficient octane and meet new specifications in regard to oxygenates, aromatics and benzene in the fuel. Reduced limits on RVP (Reid Vapor Pressure) and gasoline endpoint limit the amount of butanes that can be added, further exacerbating the problem.

Many refiners will face a shortage of light olefins (needed to make ethers and/or alcohols), with no efficient way of making more.

Most options available to FCC operators have limited potential. Use of shape selective cracking additives, or large cracking catalyst containing such additives, appeared to have only limited potential to increase yields of light olefins.

Pyrolysis units or thermal crackers produce large amounts of olefins, but little gasoline. A high severity, shape selective cracking process is also available, but like its closely related pyrolysis processes it makes large amounts of olefins, but relatively small yields of gasoline, which is highly aromatic and low in octane.

A reasonable way to summarize the state of the art on maximizing yields of light olefins from gas oil and heavier feeds is to focus on three catalytic approaches:

1. FCC Cracking catalyst with ZSM-5 and large pore zeolite sharing matrix, with large amounts of ZSM-5 crystal.

2. FCC units with additive ZSM-5 catalyst, in limited amounts.

3. Production of cracked gas from gas oil over pentasil zeolites at high severity.

These approaches will each be reviewed in more detail hereafter, in the order presented above, which is roughly chronological order.

1. Large Pore+ZSM-5–Shared Matrix

U.S. Pat. No. 3,758,403, Rosinski et al, Catalytic Cracking of Hydrocarbons with Mixture of ZSM-5 and Other Zeolites, taught the benefits of adding ZSM-5 to conventional large pore cracking catalyst formulations.

Example 2 used a catalyst consisting of 5 wt % ZSM-5, 10 wt % REY, and 85% clay. When used to crack a gas oil, it produced 11.42 LV % propylene, and a total yield of alkylate and C5+ gasoline of 89.1 LV %.

Example 3 used a catalyst consisting of 10 wt % ZSM-5, 10 wt % REY, and 80% clay. Although the ZSM-5 content doubled, propylene yields increased from 11.4 LV % to only 13.6 LV %. The total yield of alkylate and gasoline declined slightly, from 89.1 LV % to 88.6 LV %.

U.S. Pat. No. 3,847,793, Schwartz et al, Conversion of Hydrocarbons with a Dual Cracking Component Catalyst Comprising ZSM-5 Type Material, had a slightly different approach. The ZSM-5, which could be in the same particle with the large pore zeolite, or in a separate additive, was used to convert olefins to aromatics. A riser reactor with an enlarged upper portion was used, along with injection of a coking fluid near the top of the riser, to deactivate the large pore catalyst while leaving the ZSM-5 catalyst active. Gasoline boiling range material could be injected into the top of the riser for conversion. Table 2 shows that this approach reduced the mono olefin content of an FCC gasoline from 14.0 wt % to 2.9 wt %. The discussion of Examples 2 reports that ZSM-5 was effective for converting propylene to aromatics over a wide range of catalyst silica-alumina ratios.

Based on '793, large amounts of ZSM-5 should efficiently convert propylene into aromatics. This would reduce light olefin production, and perhaps exacerbate problems of producing gasoline without exceeding aromatics and/or benzene specifications.

Based on '403, use of large pore cracking catalyst with large amounts ZSM-5 additive gives only modest increases in light olefin production. A 100% increase in ZSM-5 content (from 5 wt % ZSM-5 to 10 wt % ZSM-5) increased the propylene yield less than 20%, and decreased slightly the potential gasoline yield (C5+ gasoline plus alkylate).

Neither approach seemed useful for making large amounts of light olefins via the FCC process using cracking catalyst containing large amounts of ZSM-5.

A drawback to an "all in one" catalyst, e.g., REY+H-ZSM-5 in a matrix, is catalyst availability. Mixing zeolite types in the same catalyst makes it impossible to use all the large pore cracking catalysts available today. There are more than 100 types of large pore cracking catalyst, but essentially all of the these are made without any ZSM-5 content. Refiners need to be able to, e.g., shift from a large pore cracking catalyst with bottoms cracking activity and high metals tolerance to an octane catalyst which minimizes hydrogen transfer reactions. FCC operation changes all the time in most refineries, in response to shifting crude supplies and varying product demands, and refiners want to retain the ability to use all of the cracking catalyst available to be able to constantly fine tune their FCC operation. For this reason, the marketplace has decided that use of additive catalysts is the only viable commercial option for the use of ZSM-5 and other shape selective additives. Use of separate additive catalysts will be reviewed next.

2. ZSM-5 Additives

Because refiners must retain the ability to use the myriad types of commercially available large pore cracking catalyst available today, they usually add additive catalysts, with 10–50 wt %, more usually 12 to 25 wt % ZSM-5 in a amorphous support, to their FCC units. Such additives have physical properties which allow them to circulate with the large pore cracking catalyst.

U.S. Pat. No. 4,309,280 taught adding very small amounts of powdered, neat ZSM-5 catalyst, characterized by a particle size below 5 microns. Adding as little as 0.25 wt % ZSM-5 powder to the FCC catalyst inventory increased LPG production 50%. Small amounts of neat powder behaved much like larger amounts of ZSM-5 disposed in larger particles.

A good way to add a modest amount of ZSM-5 to an FCC unit is disclosed in U.S. Pat. No. 4,994,424, incorporated by reference. ZSM-5 additive is added to the equilibrium catalyst in a programmed manner so an immediate boost in octane number, typically ½–2 octane number, is achieved.

U.S. Pat. No. 4,927,523, incorporated by reference, taught a good way to add large amounts of ZSM-5 to a unit without exceeding wet gas compressor limits. Large amounts were added, and cracking severity reduced until the ZSM-5 activity tempered from circulating through the FCC unit for several days.

ZSM-5 additive has been used commercially for almost a decade, and is now a well accepted way to increase C3 and C4 olefin yields and gasoline octane, at the cost of some loss in gasoline yield.

Recent work on ZSM-5 additives has been directed at stabilizing it with phosphorus or making the additive more attrition resistant. Phosphorus stabilized ZSM-5 additive is believed to retain activity for a longer time. There may be some change in yield pattern, but none that we have been able to observe in commercial refineries. Phosphorus stabilization thus reduces the makeup rate of ZSM-5 additive required.

One drawback to use of ZSM-5 additive, even with phosphorus stabilization, is that refiners fear dilution of the large pore cracking catalyst by addition of large amounts of ZSM-5, say over 2 or 3 wt % ZSM-5 crystal, or use of more than 5 or 10 wt % additive, will reduce yields of light olefins and seriously impair conversion. Most refiners operate with significantly smaller amounts of ZSM-5 than the upper limits recited above.

Another concern is how well the unit will respond when pushed to make even more olefins. The consensus is that small amounts of ZSM-5 additive make large amounts of olefins in an FCC unit operating at low severity, but the increase in yields of light olefins attributable to ZSM-5 declines as severity increases. "Working at low severity we observe an increase in light olefinic compounds, mostly branched, in the C5–C6 range. At the same time we detect an increase in light branched alkanes and almost no effect on the aromatics and naphthenes contents. When the cracking occurs at higher temperature we observe an increase in the C7–C8 aromatics and naphthenes, but a much smaller increase in the lighter compounds." Effect of Operation Conditions on the Behaviour of ZSM-5 Addition to a RE-USY FCC Catalyst, M. F. Elia et al, Applied Catalysis, 73 (1991) 195–216, 202.

The poor response to unusually large concentrations of ZSM-5 was reported in '403, while Elia et al have shown the unfavorable response of ZSM-5 to high severity FCC operation.

Thus it seemed that ZSM-5 would be of most benefit to refiners when used in small amounts, preferably in FCC units operating at modest severity levels. Attempts to increase yields of light olefins by increasing ZSM-5 content would meet with only modest success, while going to high severity operation (a proven way to increase production of light olefins in FCC) would reduce the effectiveness of the ZSM-5 at increasing yields of light olefins.

It seemed that refiners could not expect to increase yields of light olefins from the FCC units by using conventional amounts of ZSM-5 additive. Higher severity operation would increase olefin yields (due to higher temperatures and conversion) but diminish the olefin yields attributable to ZSM-5.

We wondered what would happen at very severe conditions, at temperatures and conversions beyond those used in FCC.

Any heavy feed can be thermally cracked at extremely high temperatures to produce large yields of ethylene and other light olefins. The high temperatures needed to get high conversions also degrade the C5+ liquid products. Thermal cracking is a good way to make ethylene, but not to make gasoline.

An unusually severe catalytic route to cracked gas over USY and/or pentasil zeolites is reported in U.S. Pat. No. 4,980,053. Although more suited to a petrochemical plant than a cracking refinery, the approach represents an upper limit on conversion over pentasil zeolites, and for that reason is reviewed below.

3. High Severity Pentasil Conversion

U.S. Pat. No. 4,980,053, Zaiting Li et al, Production of Gaseous Olefins by Catalytic Conversion of Hydrocarbons, has examples of conversion of vacuum gas oil to more than 50 wt % cracked gas over zeolites ranging from pentasil, to USY, and mixtures. The process is basically a pyrolysis process, which uses a catalyst to operate at somewhat milder conditions than thermal pyrolysis processes.

Four catalysts were tested. Although precise catalyst formulations, and zeolite concentrations within each catalyst formulation, are not reported, the following information was:

Catalyst Zeolite
A "CHO" Pentasil+REY
B "ZCO" USY
C "CHP" Pentasil
D Mixture of B & C (Mix. of USY & Pentasil)

Thus catalyst A or "CHO", corresponds to the approach of '403, Rosinski, which used ZSM-5 and Y zeolite in the same catalyst particle, while catalyst D represents something closer to the additive approach.

The examples were run at conditions much more severe than those used in catalytic cracking—580 C (1076 F), at a 1 LHSV, a cat:oil ratio of 5, and steam:hydrocarbon ratio of 0.3.

| Catalyst    | A     | B     | C     | D     |
|-------------|-------|-------|-------|-------|
| wt % of:    |       |       |       |       |
| cracked gas | 52.0  | 51.2  | 54.0  | 55.6  |
| propylene   | 11.61 | 17.39 | 21.56 | 21.61 |
| butylene    | 15.64 | 14.47 | 15.64 | 15.09 |
| C5-205 C    | 31.0  | 33.1  | 27.0  | 27.5  |
| Conversion  | 93.3  | 90.3  | 87.6  | 89.1  |

It is difficult to say too much about the results because the zeolite content of the catalysts is not specified. The patentees report that "the yields of gaseous olefins over catalyst C and D are higher than the others." As far as gasoline yields, and conversion, the mixture (D=mix of pentasil+USY) gives less conversion and less gasoline yield than a single particle catalyst (A=Pentasil+REY). Use of a mixture also reduced butylene yields slightly, as compared to single particle catalyst A.

Example 2 of '053 reports production of fairly aromatic gasolines, containing more than 50 wt % aromatics. This was to be expected from the high temperatures and severe conditions. The octane number of the gasoline was 84.6 (motor method). The di-olefin content of the gasoline was not reported.

These results show use of separate additives of pentasil zeolite can reduce conversion and butylene and gasoline yield, as compared to use of single particle catalyst with both types of zeolite in a common matrix, during pyrolysis processing.

SUMMARY

Refiners operating FCC units needed more olefins, and could find no effective way to generate them using existing technology.

Based on the teachings of '403, use of ever increasing amounts of ZSM-5 and large pore zeolite in a common particle produced rapidly diminishing returns from the incremental amounts of ZSM-5. The common particle approach would also preclude refiners from using the myriad commercially available large pore catalysts needed to optimize operation of their FCC units.

Based on the state of the art on the use of separate additives in the catalytic cracking process, use of large amounts of ZSM-5 additive would also produce diminishing returns at high severity. We knew that most refiners were tending to use more severe operation to increase conversion, and improve gasoline yield and octane.

Based on the pyrolysis work reported in '053, use of large amounts of separate ZSM-5 additive at high severity reduced both conversion and gasoline yield, and would produce a highly aromatic gasoline.

We knew higher yields of light olefins were needed by refiners and that there seemed to be no good way to get them using existing FCC technology. Despite the poor prospects, based on the state of the art, we decided to do experimental work with larger amounts of separate additive ZSM-5 catalyst, and with somewhat higher severity FCC operation.

We discovered that yields of light olefins could be optimized by using unprecedented amounts of shape selective additive catalyst, and that these unexpected yield patterns persisted even at high severity catalytic cracking conditions.

BRIEF SUMMARY OF THE INVENTION

Accordingly, the present invention provides a catalytic cracking process for converting a heavy hydrocarbon feed to lighter products comprising; charging a heavy hydrocarbon feed comprising hydrocarbons boiling above 650° F. to a riser catalytic cracking reactor; charging a hot fluidized solids mixture, from a catalyst regenerator to the base of said riser reactor, said mixture comprising: a physical mixture of regenerated base FCC cracking catalyst and separate particles of shape selective zeolite cracking catalyst additive, said mixture containing 87.5 to 65 wt % base FCC catalyst and 12.5 to 35 wt % additive, and wherein said additive comprises a catalytically effective amount of a zeolite having a silica:alumina ratio above 12 and a Constraint Index of 1–12 in an amorphous support, catalytically cracking said feed at catalytic cracking conditions including a riser outlet temperature of about 925 to 1050° F. to produce catalytically cracked products including ethylene, propylene, and a C5+ gasoline fraction and a spent solids mixture comprising spent cracking catalyst and additive catalyst which are discharged from said outlet of said riser reactor; separating in a vessel containing said riser outlet a cracked product rich vapor phase, which is withdrawn from said vessel, from a spent solids mixture rich phase containing spent cracking catalyst and shape selective additive catalyst; stripping said spent solids mixture in a stripping means at stripping conditions to produce a stripped solids phase; decoking said stripped solids mixture in a catalyst regeneration means operating at catalyst regeneration conditions to produce said hot fluidized solids mixture, which is recycled to the base of said riser reactor, and fractionating said cracked product rich vapor phase in a product fractionation means to produce: at least 44.0 wt % C5+ gasoline, at least 15 LV % propylene, and no more than 2.0 wt % ethylene.

In another embodiment, the present invention provides a catalytic cracking process for converting a heavy hydrocarbon feed to lighter products comprising; charging a heavy hydrocarbon feed comprising hydrocarbons boiling above 650° F. to a base section of a riser fluidized catalytic cracking (FCC) reactor having said base and an upper outlet; charging to said base of said riser reactor a stream of hot fluidized solids from a catalyst regenerator comprising a physical mixture of: 87.5 to 75 wt % base FCC cracking catalyst, containing at least 30.0 wt % large pore zeolite, based on fresh makeup cracking catalyst, and 12.5 to 25 wt % ZSM-5 additive containing 12.5 to 50 wt % ZSM-5 in an amorphous support, catalytically cracking said feed at catalytic cracking conditions including a riser outlet temperature of 950 to 1030° F. to produce catalytically cracked products, and coked solids which are discharged from said outlet of said riser reactor; separating in a vessel containing said riser outlet said catalytically cracked products and coked solids into a cracked product rich vapor phase, and a solids rich phase containing a mixture of coked cracking catalyst and ZSM-5 additive; removing said vapor phase from said vessel and fractionating said vapor in a fractionation and product recovery means to recover as products: at least 45.0 wt % C5+ gasoline, at least 25 LV % combined C3= and C4=, and no more than 2.0 wt % C2=; removing said solids rich phase from said vessel and stripping said solids rich phase in a stripping means at stripping conditions to produce stripped coked solids; removing said stripped coked solids from said stripping means and decoking said stripped coked solids in a catalyst regeneration means operating at catalyst regeneration conditions to produce said stream of hot, fluidized solids and recycling same to the base of said riser reactor.

In another embodiment, the present invention provides a process for producing a catalytically cracked gasoline boiling range fraction with a reduced olefin content comprising: charging a heavy hydrocarbon feed comprising hydrocarbons boiling above 650° F. to a riser catalytic cracking reactor; charging a hot fluidized solids mixture, from a catalyst regenerator to the base of said riser reactor, said mixture comprising: a physical mixture of regenerated base FCC cracking catalyst and separate particles of shape selective zeolite cracking catalyst additive, said mixture containing 90 to 65 wt % base FCC catalyst and 10 to 35 wt % additive, and wherein said additive comprises a catalytically effective amount of a zeolite having a silica:alumina ratio above 12 and a Constraint Index of 1–12 in an amorphous support, catalytically cracking said feed at catalytic cracking conditions including a riser outlet temperature of about 925 to 1050° F. to produce catalytically cracked products including an olefinic C5+ gasoline fraction and a spent solids mixture comprising spent cracking catalyst and additive catalyst which are discharged from said outlet of said riser reactor; separating in a vessel containing said riser outlet a cracked product rich vapor phase, which is withdrawn from said vessel, from a spent solids mixture rich phase containing spent cracking catalyst and shape selective additive catalyst; stripping said spent solids mixture in a stripping means at stripping conditions to produce a stripped solids phase; decoking said stripped solids mixture in a catalyst regeneration means operating at catalyst regeneration conditions to produce said hot fluidized solids mixture, which is recycled to the base of said riser reactor, and fractionating said cracked product rich vapor phase in a product fractionation means to produce at least 45.0 wt %, based on fresh feed to said riser reactor, of an olefinic gasoline containing C5 to C11 unsaturates or olefins and including C7 to C10 n-olefins and C7 to C10 cyclic olefins; and at least periodically measuring the C7 to C10 n-olefin and C7 to C10 cyclic olefin content and increasing at least periodically the amount of shape selective zeolite cracking catalyst additive present in the circulating catalyst inventory by an amount sufficient to produce a reduced olefin FCC gasoline having less than 4.0 wt % olefins, based on fresh feed to said riser reactor, and at least an order of magnitude more C7 to C10 cyclic olefins than C7 to C10 n-olefins.

In another embodiment, the present invention provides a process for catalytically cracking a hydrocarbon feed while suppressing the formation of at least one of butadiene and methane comprising: charging a heavy hydrocarbon feed comprising hydrocarbons boiling above 650° F. to a riser catalytic cracking reactor; charging a hot fluidized solids mixture, from a catalyst regenerator to the base of said riser reactor, said mixture comprising: a physical mixture of regenerated base FCC cracking catalyst and separate particles of shape selective zeolite cracking catalyst additive, said mixture containing 90 to 65 wt % base FCC catalyst and 10 to 35 wt % additive, and wherein said additive comprises a catalytically effective amount of a zeolite having a silica:alumina ratio above 12 and a Constraint Index of 1–12 in an amorphous support, catalytically cracking said feed at catalytic cracking conditions including a riser outlet temperature of about 925 to 1050° F. to produce catalytically cracked products including butadiene, methane and normally liquid product fractions and a spent solids mixture comprising spent cracking catalyst and additive catalyst which are discharged from said outlet of said riser reactor; separating in a vessel containing said riser outlet a cracked product rich vapor phase, which is withdrawn from said vessel, from a spent solids mixture rich phase containing spent cracking catalyst and shape selective additive catalyst; stripping said spent solids mixture in a stripping means at stripping conditions to produce a stripped solids phase; decoking said stripped solids mixture in a catalyst regeneration means operating at catalyst regeneration conditions to produce said hot fluidized solids mixture, which is recycled to the base of said riser reactor, and fractionating said cracked product rich vapor phase in a product fractionation means to produce an overhead vapor fraction containing methane, a liquid fraction containing butadiene, and heavier liquid product fractions; and at least periodically measuring at least one of the butadiene and methane yields and increasing at least periodically the amount of shape selective zeolite cracking catalyst additive present in the circulating catalyst inventory by an amount sufficient to suppress production of butadiene or methane or both.

BRIEF DESCRIPTION OF THE DRAWINGS

The FIGURE is a simplified schematic process flow of an FCC unit operating with a preferred, but optional, quench.

DESCRIPTION OF THE PREFERRED EMBODIMENTS

An overview of the process will be presented in a review of the FIGURE then additional details of the FCC process and the shape selective additive catalyst will be presented.

A heavy hydrocarbon feed (a gas oil, a vacuum gas oil fraction, a resid, or vacuum resid or mixture) is charged via line 2 to the base of riser reactor 10. Hot regenerated catalyst flows from regenerator 30 via line 32 to the base of the riser 10.

A preferred, but optional quench stream, preferably a recycled light cycle oil or heavy naphtha from line 45, is added to one or more quench points via lines 63 or 65 at various elevations in the riser. The process works well at conventional FCC conditions, and even better at more severe FCC conditions, including a higher mix temperature in the base of the riser obtained by the use of quench technology.

Feed and hot catalyst pass up the riser, are quenched, and then are catalytically cracked at a lower temperature in the remainder of the riser. Cracked products and spent catalyst enter FCC reactor 20, where little reaction occurs. Spent catalyst is separated from cracked products by conventional means. Spent catalyst is stripped in a catalyst stripping means within vessel 20, then charged via line 24 to FCC regenerator 30. Regeneration air is added via line 34. Coke is burned from spent catalyst in the regenerator, producing flue gas removed via line 36 and hot regenerated catalyst recycled via line 32 to the base of riser reactor 10.

Hot cracked product withdrawn from vessel 20 passes via line 26 to the base of the FCC main column 40, which operates conventionally. Trays or packing fractionate the cracked product vapor into a main column bottom stream 42, sometimes called a slurry oil, one or more cycle oil products, such as a light cycle oil or LCO product withdrawn via line 55, a heavy naphtha stream withdrawn via line 48, a light naphtha stream withdrawn via line 43, and an overhead vapor stream withdrawn via line 46. Light liquid reflux returns to the column via line 58.

The heavy naphtha fraction withdrawn via line 48 may be removed as a product via line 47, but preferably some of the FCC heavy naphtha and/or some of the light cycle oil is recycled via line 45 to one or more quench points in the FCC riser reactor.

Heavy naphtha quench desulfurizes to some extent the heavy naphtha, and converts some of it to lighter gasoline, but dry gas make is minimal. LCO quench minimizes production of LCO, and helps increase gasoline yields.

There are myriad variations in FCC processing which may be used, from different types of regenerators, different reactor designs, etc., but the underlying unit operations (cracking reaction, catalyst regeneration, product fractionation) will always be present.

DESCRIPTION OF THE PREFERRED EMBODIMENTS

Riser Cracking Conditions

The conditions in the base of the riser can be conventional, or the somewhat higher temperatures, and higher cat:oil ratios taught in U.S. Pat. No. 4,818,372, incorporated herein by reference, may be used.

In general, the mix temperature at the base of the riser will be from 950–1100° F., and catalyst:oil ratios will range from 1:1 to 10:1.

Efficient cracking in the riser requires efficient feed atomization. Atomizing feed nozzle(s) which produce droplets of oil having an average particle size below 2000 microns, preferably below 1000 microns, and most preferably below 500 microns, should be used. It is beneficial if feed is vaporized within ½ second, preferably within 0.2 seconds of vapor residence time, and most preferably within 0.1 seconds of vapor residence time. Rapid feed vaporization promotes high temperature, catalytic cracking in the base of the riser reactor of a fully vaporized feed.

Quench

Quench is preferred, but not essential. When quenching is practiced, riser top temperatures of 900–1050, preferably 950 to 1025 F, will be satisfactory in many instances. Quenching can be quick, or delayed.

Quick quenching suppresses all reactions, thermal, large pore cracking and reactions promoted by ZSM-5, which is present in large amounts. ZSM-5 activity can be maximized by delayed quenching.

Quenching with modest amounts of quench fluid will usually occur after at least a second of vapor residence time in the base of the riser, and preferably after 1.5 seconds of residence time, and most preferably after 2.0 seconds of residence time.

Rather than refer to vapor residence time, which varies from unit to unit, and is difficult to calculate, quenching at the following fractional riser locations may be considered. In general, quenching should occur at least ½ way up the riser, and preferably around 6/10 to 9/10 of the way up the riser. Quenching about ¾ up the riser, or later, will be optimum in many installations. As the catalyst inventory contains large amounts of ZSM-5, retains catalytic activity long after the large pore cracking catalyst has lost most of its activity, the optimum quench point will be closer to the riser outlet than the inlet.

It is important to quench well upstream of the riser outlet. Quenching at the riser outlet, or within 10% of the distance to the riser outlet, will suppress post-riser thermal cracking, but not in riser thermal cracking. Closed cyclones are preferred, to suppress post-riser thermal cracking.

Quench Fluid

All quench fluids will increase conversion of feed, and increase both gasoline yield and octane. Either conventional, generally inert quench fluids, or mildly or highly reactive quench fluids can be used.

Conventional relatively inert quench fluids include cold solids, water, steam, or inert vaporizable liquids, such as light cycle oil, heavy cycle oil, slurry oils, or other aromatic rich streams, may be used. All such quench fluids will remove heat. Preferably liquids are used so more heat can be removed from a given weight of fluid added.

Use of a mildly reactive quench liquid, FCC heavy naphtha, is preferred, because all the benefits of quench technology are achieved, and some upgrading of the heavy naphtha is achieved.

Heavy Naphtha Quench

Heavy naphtha is usually that portion of the FCC cracked product having an initial boiling point from 220 to 325° F., a 5% boiling point of 250 to 300°, a 95% boiling point from 400 to 500 and an end boiling point from about 425° F. to 525° F. The heavy naphtha is that fraction intermediate the FCC light naphtha (C5+ to the end point for light naphtha) and light cycle oil. Considerable variation in boiling ranges of all these materials is possible, due both to local product specifications and fractionator constraints. There is usually considerable overlap between the end point of the heavy naphtha and the initial boiling point of the light cycle oil, because of imperfect fractionation.

Heavy naphtha quench is an especially preferred quench fluid. This material is almost always available downstream of an FCC unit. Its use does not add to sour water production. Its use as a quench material increases FCC conversion, and increases gasoline octane. It also, quite unexpectedly, reduces gasoline sulfur content to some extent while increasing dry gas production little, if any.

Heavy naphtha quench may be used in an amount equal to about 2.5 to 25 wt % of the fresh feed, preferably about 5 to 15 wt %.

Light Cycle Oil Quench

Light cycle oil, LCO, shares many of the advantages of heavy naphtha as a quench fluid. It is always available from the FCC main column, does not increase sour water production, and produces more light product at the expense of LCO yield.

The boiling range of LCO will usually be from 300 to 750° F., preferably from 400 to 700° F., and most preferably from 450 to 650° F.

Equilibrium Catalyst Activity

Conventional FCC catalyst, i.e., the sort of equilibrium catalyst that is present in most FCC units, can be used herein. Highly active catalysts, with high zeolite contents are preferred. The process of the present invention will make any FCC reactor using any conventional cracking catalyst work better, but significantly improved results can be achieved by using an unusually active catalyst.

Large pore zeolite contents of the fresh makeup catalyst, exclusive of any additive catalyst, of 10 to 80 wt % are suitable, with 30 to 60% preferred, and 35 to 55 wt % considered optimum.

Some of the FCC catalyst stays in the unit for months or potentially for years. Exposure to high temperature and steam causes considerable loss of crystallinity in zeolites in the FCC process, so the equilibrium catalyst will have a lower zeolite content than the fresh makeup catalyst. Because of the difficulty in calculating the actual large pore zeolite content, it is customary in many refineries to refer to the zeolite content of the equilibrium catalyst as, e.g., 25 wt %, but such references are usually to the zeolite content of the fresh makeup catalyst rather than to the zeolite content of the equilibrium catalyst.

Catalyst activities should be at least 55 MAT, more preferably at least 60 to 65 MAT, and most preferably above 70 or even 75 MAT. The MAT test is well known, and more details of it may be found in ASTM test method D3907, which is incorporated by reference.

Although not essential, the large pore cracking catalyst may contain additives to improve metals tolerance or increase stability. U.S. Pat. No. 4,454,241 teaches low sodium, phosphorus treated zeolite Y cracking catalyst.

The large pore cracking catalyst can be conventional. The practice of the present invention calls for an unusually active large pore cracking catalyst, but this can be achieved by more replacement of equilibrium catalyst, or using makeup catalyst with unusually large zeolite content. Such large pore catalysts are readily available commercially.

Shape Selective Zeolite Additive

Any zeolite having a Constraint Index of 1–12 can be used herein as part of the separate, shape selective additive. Details of the Constraint Index test procedures are provided in J. Catalysis 67, 218–222 (1981) and in U.S. Pat. No. 4,711,710 Chen et al, which are incorporated by reference.

Preferred shape selective zeolites are exemplified by ZSM-5, ZSM-11, ZSM-12, ZSM-23, ZSM-35, ZSM-38, ZSM-48, ZSM-57 and similar materials.

ZSM-5 is described in U.S. Pat. No. 3,702,886, U.S. Reissue 29,948 and in U.S. Pat. No. 4,061,724 (describing a high silica ZSM-5 as "silicalite").

ZSM-11 is described in U.S. Pat. No. 3,709,979.

ZSM-12 is described in U.S. Pat. No. 3,832,449.

ZSM-23 is described in U.S. Pat. No. 4,076,842.

ZSM-35 is described in U.S. Pat. No. 4,016,245.

ZSM-38 is described in U.S. Pat. No. 4,046,859.

ZSM-48 is described in U.S. Pat. No. 4,397,827.

ZSM-57 is described in U.S. Pat. No. 4,873,067.

These patents are incorporated by reference.

Preferably high silica, shape selective zeolites are used, i.e., with a silica/alumina ratio above 20/1, and more preferably with a ratio of 70/1, 100/1, 500/1 or even higher.

ZSM-5 zeolite is preferred, because it is a well known and a proven zeolite additive for use in catalytic cracking units.

Quite a lot of work has been done on making zeolites, such as ZSM-5, with different materials, ranging from all silica to materials containing silica and some other tetravalent metal such as boron, iron, gallium, etc. In lieu of, or in addition to, being incorporated into the zeolite framework, these and other catalytically active elements can also be deposited upon the zeolite by any suitable procedure, e.g., impregnation.

As used herein a named zeolite is defined by its crystal structure. The term ZSM-5 refers to a material which has substantially the same crystal structure as shown in U.S. Pat. No. 3,702,886. Substitution of different cations, or changing the silica/alumina, or silica/boron ratio, may result in minor modifications of the X-ray diffraction patterns of the crystalline material so produced, but it is still ZSM-5, and contemplated for use herein.

The shape selective zeolite is used in the form of a separate additive catalyst, rather than mixed in with the large pore cracking catalyst during manufacture thereof. Use of a separate additive allows a refiner to use any conventional cracking catalyst (there are more than 100 types of cracking catalyst available in the US, more types of catalyst than there are cracking units in the US) with any amount of shape selective zeolite additive.

Unusually large amounts of additive are essential. More than 10 wt % of the catalyst inventory should be shape selective additive catalyst. Preferably 12.5, 15, 20, 25, 30 wt % or more of the circulating catalyst inventory is an additive containing shape selective zeolite catalyst. For most FCC units, operation with 15 to 27.5 wt % additive will be preferred, with 17.5 to 25 wt % additive giving optimum results.

On a pure crystal basis, the circulating inventory of cracking catalyst preferably should contain at least about 3.0 wt % shape selective zeolite, and preferably contains more than 3.5 wt % ZSM-5, most preferably from 3.5 to 7.0 wt % ZSM-5 or other shape selective zeolite. In most units, operation with from 4 to 6 wt % shape selective zeolite, on a pure crystal basis, will give optimum results.

The use of additive catalyst permits adjustment of ZSM-5 level relatively independently of equilibrium catalyst properties. The additive catalyst can contain large or small amounts of ZSM-5, or other shape selective zeolite.

The shape selective zeolite may be present in the additive in the amount of 10 to 95% or higher, although usually the difficulties of preparing a binder free additive are not worth the cost and reduced attrition resistance associated with such materials. Preferably the additive material contains 10 to 65 wt % shape selective zeolite, and most preferably 12 to 40 wt % shape selective zeolite.

Quite a lot of work has been done on formulating and optimizing additive compositions. It will be briefly reviewed.

U.S. Pat. No. 4,826,793, Velten and Demmel, incorporated by reference, teaches ZSM-5 additives for FCC use with 20, 40 or 60 wt % ZSM-5 in an attrition resistant matrix.

ZSM-5 may be stabilized with phosphorous or be in a phosphorous containing matrix. Phosphorous stabilization is well known in the art, and more details of the technique may be taken from the following patents.

U.S. Pat. No. 3,911,041, Kaeding et al, which is incorporated by reference, teaches conversion of methanol and ethers over phosphorous stabilized zeolites.

U.S. Pat. No. 3,972,832, Butter et al, which is incorporated by reference, teaches and claims a composition of matter of a phosphorus containing, shape selective zeolite having at least 0.78 wt % phosphorus incorporated with the crystal structure.

U.S. Pat. No. 4,044,065, Butter et al, a Division of '832, claims conversion of aliphatics over phosphorus containing shape selective zeolites.

U.S. Pat. Nos. 4,356,338 and 4,423,266, Young, which are incorporated by reference, teach decreasing catalyst coking, and extending catalyst life, by pretreatment of the catalyst with steam and/or a phosphorus-containing compound. P-ZSM-5/Al2O3 has a much reduced coking rate, as compared to H-ZSM-5/Al2O3.

U.S. Pat. No. 4,590,321, Chu, which is incorporated by reference, claims conversion of feeds comprising C2 to C12 alkanes or alkenes at 200 to 700 C over a phosphorus stabilized zeolite made by impregnating with phosphate ions, then calcining to convert phosphate ions to an oxide of phosphorus.

Allowed U.S. application Ser. No. 07/667,586, incorporated by reference, discloses a novel catalyst useful in the cracking of hydrocarbons. The catalyst is formed with at least one zeolite, a first clay having a first average particle size and a second clay having a smaller average particle size than the first clay, wherein at least one of the clays or the zeolite is first treated with a source of phosphorus, such as phosphoric acid. These catalysts do not require calcination in order to obtain low attritability.

Good ZSM-5 additives are available commercially from Intercat (Z-Cat+) and from Davison (Additive O).

Shape Selective Zeolite Addition

Any conventional method of adding additive zeolite to the equilibrium catalyst can be used. The "slugging" addition method of U.S. Pat. No. 4,927,523 may be used, or the methods disclosed in U.S. Pat. No. 4,927,526 or U.S. Pat. No. 4,994,173. All of these patents relating to addition of additives are incorporated by reference.

Feedstock

Any conventional cracking unit feed may be used as feed to the FCC. The octane number response of different feeds to shape selective zeolites may be different. Gas oils, vacuum gas oils, whole crudes, resids, etc. are contemplated.

EXAMPLES

A series of tests were run, using different amounts of two shape selective additive. The additives that were tested both contained about 15.0 wt % ZSM-5 in a phosphorous stabilized matrix. The primary effect of phosphorous stabilization is to make the ZSM-5 last longer in FCC use, rather than produce significantly different yields.

Additive A contained a 55:1 silica:alumina ratio ZSM-5, while Additive B contained a 26:1 silica:alumina ratio ZSM-5. Although there are probably some selectivity differences between the 55:1 silica:alumina ratio ZSM-5 used in Additive A, and the 26:1 silica:alumina ratio ZSM-5 used in Additive B, these additives would be considered equivalent by most refiners.

The equilibrium and additive catalyst properties are summarized in the following table, CATALYST PROPERTIES.

CATALYST PROPERTIES

|  | FCC CAT | ADDITIVE A | ADDITIVE B |
|---|---|---|---|
| Wt % ZSM-5 | 0.0 | 15.0% | 15.0% |
| Density, g/cc |  |  |  |
| Packed | 0.83 | 0.95 | 0.86 |
| Loose | 0.74 | 0.84 | 0.77 |
| Real | 2.55 | 2.58 | 2.50 |
| Particle | 1.25 | 1.44 | 1.30 |
| Pore Volume, cc/g | 0.41 | 0.31 | 0.37 |
| Surface Area, M2/g | 123 | 46 | 29 |
| REY Crystallinity, wt % | 10 | — | — |
| Unit Cell Size, Ang. | 24.28 | — | — |
| Alumina, wt % | 32 | 3.2 | 32 |
| Silica, wt % | 64 | 50 | 49 |
| Nickel, ppm | 21 | 42 | 56 |
| Vanadium, ppm | 44 | 115 | 90 |
| Iron, ppm | 3000 | 3100 | 5700 |
| Copper, ppm | 14 | 17 | 27 |
| Barium, ppm | 120 | 92 | 70 |
| Calcium, ppm | 1000 | 940 | 550 |
| Lead, ppm | <12 | — | — |
| Sulfur, ppm | 200 | — | — |
| Sodium, wt % | 0.27 | 0.05 | 0.15 |
| Titanium, wt % | 0.50 | 0.83 | 1.1 |
| Phosphorus, wt % | — | 2.03 | 2.31 |
| Rare Earth, wt % | 2.7 | 0.01 | 0.01 |

The feed was a vacuum gas oil from a Nigerian crude. Feed properties are presented in Table 1.

TABLE I (Nigerian Vacuum Gas Oil)

| API Gravity | 20.3 |
|---|---|
| Density, 77/77° F. | 0.8950 |
| Aniline Point, ° F. | 181.5 |
| Bromine Number | 3.64 |
| Pour Point, ° F. | 110 |
| K.V. @ 40° C., cS | 12.36 |
| Refractive Index at 70° F. | 1.4950 |
| Molecular Weight | 415 |
| Sulfur, wt % | 0.24 |
| Hydrogen, wt % | 12.5 |
| Total Nitrogen, wt % | 0.18 |
| Basic Nitrogen, ppm | 800 |
| Conradson Carbon, wt % | 1.00 |
| Paraffins, wt % | 22.2 |
| Naphthenes, wt % | 32.6 |
| Aromatics, wt % | 45.2 |
| Aromatic Carbon, wt % | 13 |
| Ni, ppm | 3.6 |
| V, ppm | 0.30 |
| Na, ppm | <5.0 |
| Fe, ppm | 1.4 |
| Cu, ppm | 0.70 |
| IBP, ° F. | 604 |
| EP, ° F. | 1001 |
| EP, Vol % | 90.5 |

Example 1

A fluid catalyst consisting of a physical mixtures of separate particles of Additive B (ZSM-5 zeolite, 26/1 $SiO_2/Al_2O_3$ in a phosphorus containing matrix, steamed to 4–5 alpha) and E-cat, an equilibrium faujasite cracking catalyst was evaluated for cracking the Nigerian vacuum gas oil in a laboratory once-through riser pilot unit using varying cat/oil ratios. Reaction Conditions used were 1000° F., 5 sec. residence time, and 35 psig. Test results are given in Table II.

TABLE II

EFFECT OF ZSM-5 ON PRODUCT YIELDS: COMPARISON OF DIFFERENT ZSM-5 ADDITIVE LEVELS

|  |  | E-CAT/ZSM-5 Additive Blend (wt/wt) | | | |
|---|---|---|---|---|---|
| Catalyst | E-CAT | 87.5/12.5 | 75/25 | 50/50 | 25/75 |
| Cat/Oil Ratio | 6.8 | 6.7 | 6.7 | 6.6 | 7.1 |
| Conversion, vol % | 74.5 | 71.6 | 72.9 | 68.9 | 53.9 |
| C5+ Gaso., vol % | 63.3 | 51.9 | 47.3 | 39.2 | 29.5 |
| Total $C_4$'s, vol % | 13.1 | 23.0 | 21.3 | 19.7 | 15.7 |
| LFO, vol % | 18.4 | 18.7 | 17.9 | 19.1 | 18.8 |
| HFO, vol % | 7.1 | 9.7 | 9.1 | 12.0 | 27.3 |
| Dry Gas ($C_3$—), wt % | 7.1 | 7.3 | 14.2 | 16.8 | 14.1 |
| Coke, wt % | 4.6 | 4.6 | 3.2 | 3.8 | 2.3 |
| C4, vol % | 1.2 | 1.8 | 1.6 | 2.2 | 2.3 |
| iC4, vol % | 5.5 | 8.0 | 7.1 | 6.7 | 3.9 |
| C4=, vol % | 6.4 | 6.2 | 13 | 11 | 9.5 |
| C3=, vol % | 6.4 | 13.2 | 19 | 17 | 12 |
| C4= + C3=, vol % | 12.8 | 19.4 | 32 | 28 | 21.5 |
| LPG, vol % | 21.5 | 30.8 | 41.3 | 43.4 | 33.4 |
| C2=, wt % | 0.75 | 1.12 | 1.69 | 2.45 | 2.68 |
| C1 + C2, wt % | 2.37 | 2.88 | 3.16 | 3.79 | 4.44 |
| $H_2$, wt % | 0.06 | 0.08 | 0.08 | 0.08 | 0.1 |
| RON | 92.5 | 95.6 | 95.2 | 96.8 | 97.0 |
| MON | 80.1 | 82.3 | 82.5 | 83.6 | 83.9 |

As used herein, conversion refers to total conversion, LV %, of fresh feed. The term C5 + gasoline refers to C5 –385° F. material recoverable from the cracked products. Many refiners will have somewhat different cut points for gasoline boiling range product, or provide a light and a heavy naphtha product. It is always possible to calculate the yield of C5+ –385° which could be obtained by proper fractionation, and it is this yield which is referred to herein.

This example clearly shows that a maximum of light olefin yields occurs at an additive level of about 25 wt % at constant severity (cat/oil ratio). ZSM-5 (at 25 wt % additive level) more than doubles $C_3$ and $C_4$ olefin production (compared with the base faujasite catalyst alone) with minimal loss in overall conversion. At lower additive levels, conversion of reactive gasoline-range olefins and paraffins is not complete. Above 25 wt %, conversion is complete and the major effect of ZSM-5 is dilution of the base cracking catalyst with concomitant loss in overall conversion.

Example 2

A fluid catalyst consisting of ZSM-5 zeolite (55/1 $SiO_2/Al_2O_3$ incorporated in a phosphorus containing matrix) steamed to 2 alpha and faujasite cracking catalyst was tested using the same feed and laboratory apparatus. Reaction conditions used were 1000° F., 5 sec. residence time, 35 psig. The catalyst was cracking catalyst/ZSM-5 steamed to 2 alpha. Test results are given in Table III.

TABLE III

EFFECT OF ZSM-5 ON PRODUCT YIELDS: COMPARISON OF DIFFERENT ZSM-5 ADDITIVE LEVELS

|  |  | E-CAT/ZSM-5 Additive Blend (wt/wt) | | |
| --- | --- | --- | --- | --- |
| Catalyst | E-CAT | 87.5/12.5 | 75/25 | 50/50 |
| Cat/Oil Ratio | 5.2 | 5.1 | 5.1 | 4.7 |
| Total Conversion, Vol % | 71.8 | 66.6 | 59.2 | 53.4 |
| C5+ Gasoline, Vol % | 58.7 | 45.0 | 41.1 | 34.5 |
| Total $C_4$'s, vo l% | 11.6 | 12.4 | 11.3 | 9.9 |
| LFO, vol % | 19.1 | 19.3 | 21.5 | 21.3 |
| HFO, vol % | 9.1 | 14.2 | 19.4 | 25.3 |
| Coke, wt % | 3.5 | 3.7 | 2.6 | 2.2 |
| Dry; Gas ($C_3$—), wt % | 9.8 | 15.2 | 12.9 | 13.5 |
| C4, vol % | 0.9 | 1.1 | 0.8 | 0.6 |
| iC4, vol % | 4.6 | 4.6 | 3.4 | 2.5 |
| C4=, Vol % | 6.1 | 6.7 | 7.2 | 6.8 |
| C3=, Vol % | 9.4 | 12.3 | 17.2 | 15.2 |
| C4= + C3=, Vol % | 15.5 | 19.0 | 24.4 | 22.0 |
| LPG, Vol % | 23.6 | 30.5 | 29.0 | 28.1 |
| C2=, wt % | 0.97 | 1.87 | 1.24 | 1.50 |
| C1 + C2, wt % | 3.08 | 5.08 | 3.05 | 3.29 |
| $H_2$, wt % | 0.08 | 0.12 | 0.07 | 0.07 |
| RON | 92.9 | 94.3 | 94.6 | 94.9 |
| MON | 80.9 | 85.4 | 81.6 | 81.7 |

Again, this example clearly shows that a maximum of light olefin yields occurs at an additive level of about 25 wt %. At equivalent severity (similar catalyst/oil ratio), the $C_3$ and $C_4$ olefin yields decrease before and after the 25 wt % optimal level. The diffusion dilution effect is more pronounced in this example, leading to significant loss in conversion.

Example 3

A fluid catalyst consisting of ZSM-5 zeolite (26/1 $SiO_2$/$Al_2O_3$ incorporated in a phosphorus containing matrix) steamed to 4–5 alpha and faujasite cracking catalyst was evaluated for cracking the Nigerian vacuum gas oil in the same test apparatus at similar total conversion levels. The reaction conditions were 1000° F., 5 sec. residence time, and 35 psig. The faujasite cracking catalyst/ZSM-5 were steamed to 4–5 alpha. The results are reported in Table IV.

TABLE IV

GC ANALYSIS FOR $C_5$ OLEFINS IN $C_5$+ GASOLINE: COMPARISON OF DIFFERENT ZSM-5 ADDITIVE LEVELS

|  |  | E-CAT/ZSM-5 Blend (wt/wt) | | |
| --- | --- | --- | --- | --- |
|  | E-CAT | 87.5/12.5 | 75/25 | 50/50 |
| Conversion, vol % | 68.6 | 69.6 | 69.5 | 68.9 |
| Gaso. Conversion, | | | | |
| vol % | 55.1 | 49.7 | 44.3 | 39.2 |
| wt % | 46.1 | 41.7 | 37.2 | 33.4 |
| C5 Olefins (wt % feed) | | | | |
| 2-methyl-1-$C_4$= | 0.36 | 0.44 | 0.46 | 0.37 |
| 2-methyl-2-$C_4$= | 0.86 | 1.04 | 1.13 | 0.89 |
| 3-methyl-1-$C_4$= | 0.04 | 0.06 | 0.05 | 0.05 |
| Total Isoamylenes | 1.26 | 1.54 | 1.64 | 1.30 |
| 1-pentene | 0.16 | 0.13 | 0.13 | 0.10 |
| C-2-pentene | 0.29 | 0.24 | 0.19 | 0.19 |
| T-2-pentene | 0.50 | 0.43 | 0.43 | 0.33 |
| Total pentenes | 0.95 | 0.81 | 0.75 | 0.61 |
| Total $C_5$ olefins | 2.20 | 2.35 | 2.40 | 1.91 |
| Aromatics (wt % feed) | 16.6 | 15.2 | 12.8 | 12.5 |
| Benzene (wt % feed) | 1.00 | 0.72 | 0.87 | 0.91 |

Table IV shows the GC analysis of gasoline products from the faujasite cracking catalysts with and without ZSM-5. This example clearly shows total isoamylenes go through a maximum at the 25 wt % additive level with about 30 percent increase over the base catalyst at equivalent conversion. The fraction of branched/total $C_5$ olefins increases from 0.57 for the base case to about the thermodynamic equilibrium of about 0.66–0.68 with 12.5–25 wt % ZSM-5 additive levels. The reactive isoamylenes (2-methyl-2-butene and 2-methyl-1-butene) can be etherified to TAME. The increase in isoamylene yields is accompanied by roughly equal decrease in linear $C_5$ olefins (pentenes) with the total $C_5$ olefin level remaining essentially constant in the gasoline pool. Additionally, the results show decrease in aromatics and slight decrease in benzene (normalized to constant feed basis) in the presence of ZSM-5. This should have significant environmental impact.

Example 4

A fluid catalyst consisting of ZSM-5 zeolite (26/1 $SiO_2$/$Al_2O_3$ incorporated in a phosphorus containing matrix) steamed to 4–5 alpha and faujasite cracking catalyst was evaluated for cracking the Nigerian VGO in a laboratory once-through riser pilot unit at similar total conversion levels. Reaction conditions were 1000° F., 5 sec. residence time, and 35 psig. The catalyst was a blend of faujasite cracking catalyst and ZSM-5 steamed to 4–5 alpha. Test results are given in Table V.

TABLE V

EFFECT OF ZSM-5 ON PRODUCT YIELDS: COMPARISON OF DIFFERENT ZSM-5 ADDITIVE LEVELS

|  | Faujasite Catalyst | Faujasite/ZSM-5 75/25 (wt/wt) |
| --- | --- | --- |
| Total Conversion, vol % | 72.2 | 73.0 |
| C5+ Gasoline, | | |
| vol % | 58.1 | 47.6 |
| wt % | 48.8 | 40.6 |
| Total $C_4$'s, wt % | 6.7 | 12.1 |
| LFO, wt % | 19.1 | 17.9 |
| HFO, wt % | 10.8 | 11.7 |
| Coke, wt % | 4.3 | 4.1 |
| C4, wt % | 0.6 | 1.0 |
| iC4, wt % | 2.7 | 4.0 |
| iC4=, wt % | 1.1 | 2.9 |
| C4=, wt % | 3.5 | 7.1 |
| C3=, wt % | 5.4 | 8.4 |
| C4= + C3=, wt % | 8.9 | 15.5 |
| C3, wt % | 1.5 | 2.0 |
| LPG, wt | 13.7 | 22.5 |
| C2=, wt % | 1.0 | 1.7 |
| $H_2$, wt % | 0.1 | 0.07 |
| RON | 92.9 | 95.4 |

Table V shows that the ZSM-5 at the 25 wt % additive level produces more than twice as much isobutylene (which can be directly etherified with methanol to MTBE) compared with the base faujasite catalyst alone.

For reaction conditions of 1000° F., 5 sec. residence time, 35 psig, a faujasite cracking catalyst, achieved a total conversion of 72.2 vol % with gasoline yield of 58.1 LV %, 48.8 wt %, PIONA data of the gasoline samples in Example 4 are shown on Tables VI & VII. All results reported are wt % of fresh feed.

TABLE VI

COMPOSITIONAL ANALYSIS (PIONA) OF C5+ GASOLINE

| | SATURATES | | | UNSATURATES | | | | |
|---|---|---|---|---|---|---|---|---|
| C-n | i-par | n-par | naph | iso- | normal | cyclic | AROMATICS | TOTALS |
| 4 | 0.101 | 0.066 | 0 | 0.085 | 0.385 | 0 | 0 | 0.638 |
| 5 | 1.455 | 0.251 | 0.065 | 1.118 | 0.881 | 0.142 | 0 | 3.911 |
| 6 | 2.516 | 0.297 | 1.010 | 1.645 | 0.761 | 9.545 | 0.332 | 7.106 |
| 7 | 1.870 | 0.272 | 1.651 | 0.978 | 0.287 | 0.424 | 1.893 | 7.376 |
| 8 | 1.385 | 0.201 | 1.348 | 0.794 | 0.133 | 0.380 | 4.598 | 8.840 |
| 9 | 0.939 | 0.135 | 0.696 | 0.558 | 0.056 | 0.208 | 4.707 | 7.301 |
| 10 | 0.614 | 0.076 | 0.284 | 0.202 | 0 | 0 | 3.737 | 4.913 |
| 11 | 0.428 | 0 | 0.047 | 0.0 | 0.072 | 0.0 | 6.189 | 6.736 |
| SUM | 9.31 | 1.30 | 5.10 | 5.38 | 2.58 | 1.70 | 21.46 | 46.82 |

>200° C. 1.659 others 0.320 (unk. dicycloparaffins)

TABLE VII

COMPOSITIONAL ANALYSIS (PIONA) OF C5+ GASOLINE

| | SATURATES | | | UNSATURATES | | | | |
|---|---|---|---|---|---|---|---|---|
| C# | i-par | n-par | naph | iso- | normal | cyclic | AROMATICS | SUM |
| 4 | 0.056 | 0.0 | 0.0 | 0.085 | 0.274 | 0.0 | 0 | 0.415 |
| 5 | 0.899 | 0.198 | 0.062 | 1.067 | 0.563 | 0.109 | 0.0 | 2.898 |
| 6 | 1.314 | 0.212 | 0.756 | 0.963 | 0.296 | 0.488 | 0.395 | 4.424 |
| 7 | 0.845 | 0.190 | 1.402 | 0.389 | 0.063 | 0.543 | 2.061 | 5.493 |
| 8 | 0.696 | 0.168 | 1.314 | 0.300 | 0 | 0.497 | 4.534 | 7.509 |
| 9 | 0.526 | 0.123 | 0.740 | 0.177 | 0 | 0.283 | 4.450 | 6.299 |
| 10 | 0.387 | 0.067 | 0.430 | 0.183 | 0 | 0.052 | 3.728 | 4.847 |
| 11 | 0.320 | 0 | 0.141 | 0 | 0.107 | 0 | 6.442 | 7.010 |
| SUM | 15.04 | 0.96 | 4.85 | 3.16 | 1.30 | 1.97 | 21.61 | 38.90 |

>200° C. 1.376

Reaction Conditions: 1000° F., 5 sec. residence time, 35 psig. Faujasite cracking catalyst/25 wt % ZAM-5 additive. Total conversion 73.0 vol %; gasoline yield: 47.6 vol %, 40.6 wt %. All results are reported as weight % of fresh feed.
Catalyst: Base faujasite cracking catalyst/25 wt % ZSM-5
Total Conv.: 73.0 vol %; Gasoline yield: 47.6 vol %, 40.6 wt %. All yields are wt % of fresh feed.

In general, PIONA data indicate the gasoline loss (measured on feed basis) is due to significant shifts in isoparaffins, iso-olefins, n-olefins and n-paraffins. The level of ring paraffins (or saturated napthenes), ring olefins (or unsaturated napthenes), and aromatics remain essentially constant. The increase in aromatics generally observed (on gasoline basis) is due to concentration effects as a result of volume loss. Additionally, the absolute yield shifts occur primarily in the $C_6$ through $C_9$ range; relative yield shift appears over the entire carbon range.

Example 5

A fluid catalyst consisting of ZSM-5 zeolite (26/1 $SiO_2$/$Al_2O_3$ incorporated in a phosphorus containing matrix) steamed to 4–5 alpha and faujasite cracking catalyst was evaluated for cracking the Nigerian vacuum gas oil in a laboratory once-through riser pilot unit at similar total conversion levels. The VGO charge stock properties are given in Table I. Test conditions included reaction conditions of 1000° F., 5 sec. residence time, 35 psig. The faujasite cracking catalyst/ZSM-5 were steamed to 4–5 alpha. PONA data of the gasoline samples are shown on Table VIII.

TABLE VIII

COMPOSITIONAL ANALYSIS (PONA) OF C5+ GASOLINE
Conditions: 1000° F., 5 sec. residence time, 35 psig
Faujasite cracking catalyst/ZSM-5 steamed to 4–5 alpha

| | Faujasite Catalyst | Faujasite/ZSM-5 Blend 75/25 (wt/wt) |
|---|---|---|
| Total Conversion, vol % | 72.6 | 72.9 |
| C5+ Gasoline, vol. % (wt %) | 61.5(50.7) | 47.3(39.5) |
| C5+ Gaso. Composition (wt % feed) | | |
| Paraffins | | |
| C5 | 0.5 | 0.3 |
| C6 | 2.9 | 1.8 |
| C7 | 2.9 | 1.2 |
| C8 | 2.1 | 1.1 |
| C9 | 2.1 | 1.3 |
| C10 | 1.1 | 0.6 |
| C11 | 0.5 | 0.3 |
| C12 | 0.3 | 0.0 |
| C13 | 0.0 | 0.0 |
| Total Paraffins | 12.4 | 6.6 |
| C5+ Gaso. Composition (wt % feed) | | |
| Alkylbenzenes | | |
| C6 | 0.4 | 0.4 |

TABLE VIII-continued

COMPOSITIONAL ANALYSIS (PONA) OF C5+ GASOLINE
Conditions: 1000° F., 5 sec. residence time, 35 psig
Faujasite cracking catalyst/ZSM-5 steamed to 4–5 alpha

|  | Faujasite Catalyst | Faujasite/ZSM-5 Blend 75/25 (wt/wt) |
|---|---|---|
| C7 | 2.2 | 2.1 |
| C8 | 5.2 | 4.4 |
| C9 | 5.4 | 4.6 |
| C10 | 2.4 | 2.5 |
| C11 | 1.2 | 1.3 |
| C12 | 0.3 | 0.3 |
| C13 | 0.1 | 0.0 |
| Total Alkylbenzenes | 17.2 | 15.6 |
| Olefins (mono-olefins) | 6.6 | 4.8 |
| Cy Olefins + Di Olefins | 2.4 | 2.6 |
| Naphthenes: (monocycloparaffins) | 7.8 | 5.6 |
| Naphthalenes | 0.9 | 0.8 |
| Dicycloparaffins | 0.4 | 0.4 |
| Indans + Tetralins | 2.5 | 2.8 |

The Table VIII results indicate that the gasoline loss (on feed basis) occurs in the following order: paraffins>>mono-olefins=saturated naphthenes>>the unsaturated naphthenes=alkylbenzenes; the dicycloparaffins, and cyclo-olefins+di olefins remain essentially constant. Additionally, the absolute yield shifts for the paraffins occur primarily in the $C_6$ through $C_{10}$ range; relative yield shift appears over the entire carbon range.

COMPARISON TO U.S. Pat. No. 3,758,403

The amount of ZSM-5, on a pure crystal basis, used in the present invention seems at first glance well within the broad ranges of ZSM-5 actually used in U.S. Pat. No. 3,758,403. Although the amount of ZSM-5 used is within the range used in the art, the high yields of light olefins achieved with separate particle additives could not have been predicted from the art. This can be seen by comparing propylene yields to crystal content.

Example 2 of '403 used a catalyst consisting of 5 wt % ZSM-5, 10 wt % REY, and 85% clay. When used to crack a gas oil, it produced 11.42 LV % propylene, and a total yield of alkylate and C5+ gasoline of 89.1 LV %.

In Example 3 of '403, the catalyst contains 10 wt % ZSM-5 10% REY and 80 wt % clay, in a single composite particle. The ZSM-5 content doubled, but propylene yields only increased from 11.4 LV % to only 13.6 LV %. The results are summarized:

| ZSM-5, wt % | 0 | 5 | 10 |
|---|---|---|---|
| REY, wt % | 10 | 10 | 10 |
| MATRIX, wt % | 90 | 85 | 80 |
| C3=, LV % | 5.8 | 11.42 | 13.6 |
| C3=, wt % | 3.4 | 6.64 | 7.9 |
| C3/C4=, LV % | 12.7 | 19.8 | 24.7 |
| delta C3, LV % | 0 | 5.62 | 7.8 |
| LOP | — | 1.12 | 0.78 |

Where LOP=Light Olefin Productivity, the ratio of incremental propylene yields per weight of ZSM-5, on a pure crystal basis. This is a good way to measure the effectiveness of the ZSM-5 at generating light olefins. It ignores yields of propylene which would be achieved anyway, i.e., with no ZSM-5 present. The LOP, or incremental yields of propylene per weight percent ZSM-5 (pure crystal) in the catalyst inventory, is a good measure of the amount of benefit derived from a given investment in ZSM-5.

| Additive wt % | 0 | 12.5 | 25.0 | 50.0 | 75.0 |
|---|---|---|---|---|---|
| ZSM-5 wt % | 0 | 1.87 | 3.75 | 7.50 | 11.25 |
| REUSY wt % | 35 | 30.63 | 26.25 | 17.50 | 8.75 |
| Matrix wt % | 65 | 67.50 | 70.00 | 75.00 | 80.00 |
| C3=, -LV % | 6.4 | 13.2 | 19 | 17 | 12 |
| dC3= LV % | 0 | 6.8 | 12.6 | 10.6 | 5.6 |
| C3/C4=, LV % | 12.8 | 19.4 | 32 | 28 | 21.5 |
| LOP |  | 3.63 | 3.36 | 1.41 | 0.49 |

The additive catalyst approach, with 3.75 wt % ZSM-5 crystal in catalyst inventory (P-ZSM-5) increased combined C3 and C4 olefin yields greatly, and roughly tripled the propylene yield.

In the single particle approach of U.S. Pat. No. 3,758,403 yields of combined C3 and C4 olefin increased, but an increase of 100% of ZSM-5 crystal produced only about a 19% increase in C3/C4 olefins. Even with 10 wt % ZSM-5 crystal in the catalyst particles, only 13.6 LV % propylene was produced. In our approach, using a separate additive catalyst, with only 3.75 wt % ZSM-5 in the inventory, propylene yields of 19 LV % were achieved.

Expressed in terms of light olefin productivity, LOP, the '403 process gave LOP's of 1.12 and 0.78, while the LOP of the process of the present invention is significantly higher, well above 3.0, from the range of 12.5 to 25 wt % additive.

We do not know why using roughly 3.75 wt % ZSM-5 as a separate additive particle produces roughly 50% more propylene as compared to single particle cracking catalyst with 10 wt % ZSM-5, but this is what our experiments show.

The results show synergistic yields of light olefins when the catalyst inventory contains carefully selected, large amounts of ZSM-5 additive.

These results are of course dependent on the feedstock, and to a lesser extent on the properties of the equilibrium catalyst, but similar benefits will be seen with other feeds, and in commercial units.

The results do not reflect any quenching effect. Quench technology usually will increase olefin yields further, and works very well with use of large amounts of ZSM-5, but the experiments simply show the effect of varying amounts of ZSM-5 addition. Most refiners will also prefer to quench.

The process of the present invention requires unusual operation. Unprecedented amounts of ZSM-5 additive produce higher yields of C3 and C4 olefins than could have been predicted based on Rosinski's work with ZSM-5 crystal mixed in the same particle with the large pore cracking catalyst.

The process of the present invention lets refiners produce reformulated fuels and/or substantially increase propylene and butylene yields and minimize gasoline yield loss.

The process of the present invention also increases yields of light olefins, without producing a highly aromatic gasoline. Although the yield of gasoline decreases with increasing yields of light olefins, the gasoline fraction remaining is not unduly aromatic. The gasoline volume loss with addition of ZSM-5 results in increased C3 and C4 olefins, which can be added back to the gasoline pool as alkylate and MTBE, ultimately reducing further base aromatic and benzene levels. The degree of reduction will depend on the disposition of the light olefins and amount of ZSM-5 used. Typical volume swell factors for $iC_4^=$ to MTBE, $nC_4^=$ to alkylate and $C_3^=$ to alkylate are:

Vol % gasoline from alkylate: 1.78×Vol % $nC_4^=$

Vol % gasoline from alkylate: 1.70×Vol % $nC_3^=$
Vol % gasoline from MTBE: 1.26×Vol % $iC_4^=$ The advantages of operating with unusually large amounts of ZSM-5, or other shape selective additive, also shows up in other cracked products besides C3 and C4 olefins. These advantageous yields, or suppression of undesired products, can be summarized as follows:

Low Olefin Gasoline

The process of the present invention produces an unusual gasoline fraction, with a significant reduction in olefin content as compared to catalytically cracked naphthas from FCC units using more conventional amounts of ZSM-5 additive. The olefin content is reduced throughout the entire gasoline range material, which could have significant environmental impact.

It is possible to produce yields of at least 45.0 wt %, based on fresh feed to said riser reactor, of an olefinic gasoline having less than 4.0 wt % olefins, based on fresh feed to said riser reactor.

The olefins in gasoline are very reactive, and it is beneficial if high octane catalytically cracked gasoline can be produced with such a low olefin content. The gasoline product of the present invention is very unusual in having at least an order of magnitude more C7 to C10 cyclic olefins than C7 to C10 n-olefins. Conventional FCC gasolines usually have about 2 or 3 times as much cyclics to normals, whereas gasoline produced according to the claimed method contains more than 10 times as much cyclics to normals.

Reduced Benzene Content FCC Gasoline

Expressed as wt % of feed to the FCC, the process of the present invention reduces total aromatics production to some extent, and greatly reduces the yields of benzene, based on the data in Table IV. To minimize benzene production, operation with 10 to 20 wt % ZSM-5 additive seems to give better results, preferably with 11 to 15 wt % ZSM-5. This result was also unexpected, that benzene yields would decrease with such large amounts of additive, and decrease even faster than gasoline yields, at least up to the 12.5 wt % additive level.

Methane Suppression

Other differences from conventional FCC operation were observed. Butadiene production, an unwanted but heretofore unavoidable byproduct of the cracking reaction, is strongly temperature dependent. Butadiene production is undesirable for several reasons, but the most significant one is usually that acid consumption in HF alkylation units is directly related to butadiene content. Attempts at increasing gasoline octane by increasing FCC riser top temperature increased acid consumption in the HF alkylation unit, and exacerbated the problem of disposing of acid soluble oil (ASO) produced during alkylation.

Using our catalyst system, with phosphorus stabilized ZSM-5 additive, butadiene yields are cut almost in half, at all temperatures. This effect was completely unexpected, especially in view of the work of Robinson et al, U.S. Pat. No. 4,455,388, who reported that "silicalite" (a high silica form of ZSM-5) could be promoted with phosphorous to produce diolefins. Although not directly applicable, as the patent was directed at an oxidatise dehydrogenation catalyst, it is surprising that phosphorus stabilized ZSM-5 reduces butadiene yields in FCC, while promoting for butadiene production in '388.

Methane Suppression

Methane yields can also be suppressed. Methane is a low value product, usually burned as fuel. Although not so troublesome a product as butadiene, it must be dealt with in a refinery, and is compressed and charged to a wet gas compressor and processed in a gas plant so that more valuable components can be recovered therefrom. Increased methane production can easily overload the wet gas compressor, and increase pressures in the main fractionator and riser reactor, degrading the yield structure. Thus it is highly beneficial to be able to have a way to control methane production.

Constant Gasoline Yield

Besides producing unusual products, the catalyst system of the present invention makes the FCC unit operate differently. Most refiners accepted as a law of nature that anything which increased gasoline octane would decrease gasoline yield, in an FCC unit operating in gasoline mode. Thus raising riser top temperature to increase octane (or to increase C3 and C4 olefin yield) reduced gasoline yields. The use of large amounts of shape selective additive repeals this law.

Refiners using the catalyst system of the present invention now have much greater flexibility in operating their units. With 25% ZSM-5 additive, gasoline yields are relatively constant even as riser top temperature increased from 1000 F to 1075 F.

What is claimed is:

1. A process for producing a catalytically cracked gasoline boiling range fraction with a reduced olefin content comprising:
   a. charging a heavy hydrocarbon feed comprising hydrocarbons boiling above 650° F. to a riser catalytic cracking reactor;
   b. charging a hot fluidized solids mixture, from a catalyst regenerator to the base of said riser reactor, said mixture comprising:
      a physical mixture of regenerated base FCC cracking catalyst and separate particles of shape selective zeolite cracking catalyst additive, said mixture containing 90 to 65 wt % base FCC catalyst and 10 to 35 wt % additive, and wherein
      said additive comprises a catalytically effective amount of a zeolite having a silica:alumina ratio above 12 and a Constraint Index of 1–12 in an amorphous support,;
   c. catalytically cracking said feed at catalytic cracking conditions including a riser outlet temperature of about 925 to 1050° F. to produce catalytically cracked products including an olefinic C5+ gasoline fraction and a spent solids mixture comprising spent cracking catalyst and additive catalyst which are discharged from said outlet of said riser reactor;
   d. separating in a vessel containing said riser outlet a cracked product rich vapor phase, which is withdrawn from said vessel, from a spent solids mixture rich phase containing spent cracking catalyst and shape selective additive catalyst;
   e. stripping said spent solids mixture in a stripping means at stripping conditions to produce a stripped solids phase;
   f. decoking said stripped solids mixture in a catalyst regeneration means operating at catalyst regeneration conditions to produce said hot fluidized solids mixture, which is recycled to the base of said riser reactor, and
   g. fractionating said cracked product rich vapor phase in a product fractionation means to produce at least 45.0 wt %, based on fresh feed to said riser reactor, of an olefinic gasoline containing C5 to C11 unsaturates or olefins and including C7 to C10 n-olefins and C7 to C10 cyclic olefins; and h. at least periodically measuring the C7 to C10 n-olefin and C7 to C10 cyclic olefin content and increasing at least periodically the amount of shape selective zeolite cracking catalyst additive present in the circulating catalyst inventory by an amount sufficient to produce a reduced olefin FCC gasoline having less than 4.0 wt % olefins, based on fresh feed to said riser reactor, and at least an order of magnitude more C7 to C10 cyclic olefins than C7 to C10 n-olefins.

2. A process for catalytically cracking a hydrocarbon feed while suppressing the formation of at least one of butadiene and methane comprising:

a. charging a heavy hydrocarbon feed comprising hydrocarbons boiling above 650° F. to a riser catalytic cracking reactor;

b. charging a hot fluidized solids mixture, from a catalyst regenerator to the base of said riser reactor, said mixture comprising:

a physical mixture of regenerated base FCC cracking catalyst and separate particles of shape selective zeolite cracking catalyst additive, said mixture containing 90 to 65 wt % base FCC catalyst and 10 to 35 wt % additive, and wherein said additive comprises a catalytically effective amount of a zeolite having a silica:alumina ratio above 12 and a Constraint Index of 1–12 in an amorphous support,;

c. catalytically cracking said feed at catalytic cracking conditions including a riser outlet temperature of about 925 to 1050° F. to produce catalytically cracked products including butadiene, methane and normally liquid product fractions and a spent solids mixture comprising spent cracking catalyst and additive catalyst which are discharged from said outlet of said riser reactor;

d. separating in a vessel containing said riser outlet a cracked product rich vapor phase, which is withdrawn from said vessel, from a spent solids mixture rich phase containing spent cracking catalyst and shape selective additive catalyst;

e. stripping said spent solids mixture in a stripping means at stripping conditions to produce a stripped solids phase;

f. decoking said stripped solids mixture in a catalyst regeneration means operating at catalyst regeneration conditions to produce said hot fluidized solids mixture, which is recycled to the base of said riser reactor, and g. fractionating said cracked product rich vapor phase in a product fractionation means to produce an overhead vapor fraction containing methane, a liquid fraction containing butadiene, and heavier liquid product fractions; and h. at least periodically measuring at least one of the butadiene and methane yields and increasing at least periodically the amount of shape selective zeolite cracking catalyst additive present in the circulating catalyst inventory by an amount sufficient to suppress production of butadiene or methane or both.

3. The process of claim 2 wherein said additive comprises a catalytically effective amount of phosphorous or a compound thereof to reduce coking.

* * * * *